(12) United States Patent
Shriber et al.

(10) Patent No.: US 9,977,800 B2
(45) Date of Patent: May 22, 2018

(54) SYSTEMS AND METHODS FOR ENABLING A USER TO OPERATE ON DISPLAYED WEB CONTENT VIA A WEB BROWSER PLUG-IN

(75) Inventors: John S. Shriber, New York, NY (US); Roman Zaks, New York, NY (US)

(73) Assignee: NEWSPLUG, INC., New York, NY (US)

( * ) Notice: Subject to any disclaimer, the term of this patent is extended or adjusted under 35 U.S.C. 154(b) by 159 days.

(21) Appl. No.: 13/420,507

(22) Filed: Mar. 14, 2012

(65) Prior Publication Data

US 2012/0240053 A1  Sep. 20, 2012

Related U.S. Application Data

(60) Provisional application No. 61/452,595, filed on Mar. 14, 2011.

(51) Int. Cl.
| | | |
|---|---|---|
| G06F 17/30 | (2006.01) | |
| G06F 17/22 | (2006.01) | |
| G06F 17/27 | (2006.01) | |
| G06Q 10/10 | (2012.01) | |
| G06F 3/0482 | (2013.01) | |
| G06F 3/0484 | (2013.01) | |
| H04L 29/08 | (2006.01) | |

(52) U.S. Cl.
CPC ...... *G06F 17/30312* (2013.01); *G06F 3/0482* (2013.01); *G06F 3/04842* (2013.01); *G06F 17/2247* (2013.01); *G06F 17/279* (2013.01); *G06F 17/3053* (2013.01); *G06F 17/30554* (2013.01); *G06F 17/30864* (2013.01); *G06F 17/30867* (2013.01); *G06Q 10/10* (2013.01); *H04L 67/02* (2013.01); *H04L 67/10* (2013.01)

(58) Field of Classification Search
CPC ......... G06F 17/30899; G06F 17/30905; G06F 17/241; G06F 17/30; G06F 17/243; G06F 15/16
USPC .......................... 715/231, 749, 233; 709/206
See application file for complete search history.

(56) References Cited

U.S. PATENT DOCUMENTS

| | | |
|---|---|---|
| 6,199,081 B1 | 3/2001 | Meyerzon et al. |
| 6,718,365 B1 | 4/2004 | Dutta |
| 7,613,769 B1 | 11/2009 | Hess |
| 7,617,190 B2 | 11/2009 | Wright et al. |
| 7,634,535 B2 | 12/2009 | Watson |
| 7,640,184 B1 | 12/2009 | Lunt |
| 7,669,123 B2 | 2/2010 | Zuckerberg et al. |
| 7,734,610 B2 | 6/2010 | Rakowski et al. |
| 7,957,723 B2 | 6/2011 | Venkata et al. |
| 7,971,147 B2 | 6/2011 | Subbarao et al. |
| 7,984,056 B1 | 7/2011 | Kane |
| 8,037,093 B2 | 10/2011 | Tiu, Jr. et al. |
| 8,082,288 B1 | 12/2011 | Yeh et al. |
| 8,276,079 B2 | 9/2012 | Davar et al. |
| 8,290,926 B2 | 10/2012 | Ozzie et al. |

(Continued)

*Primary Examiner* — Sang H Kim
(74) *Attorney, Agent, or Firm* — Greenberg Traurig, LLP

(57) ABSTRACT

A method and apparatus is disclosed that transmits a plug-in module to a web browser of a client computer. The web browser displays web content in a main window. The plug-in module, when activated, causes the web browser to display a user interface to a user of the client computer. The user interface is separate from the main window of the web browser, displays at least a portion of the web content, and is configured to enable the user to operate on the displayed at least a portion of the web content.

23 Claims, 15 Drawing Sheets

(56) References Cited

U.S. PATENT DOCUMENTS

| | | |
|---|---|---|
| 8,589,391 B1 | 11/2013 | Reynar et al. |
| 8,589,418 B1 | 11/2013 | Kane |
| 8,601,055 B2 | 12/2013 | Smith et al. |
| 8,606,845 B2 | 12/2013 | Dickinson et al. |
| 8,667,385 B1* | 3/2014 | Mui et al. .................... 715/231 |
| 8,874,541 B1 | 10/2014 | Vandehey et al. |
| 9,058,391 B2 | 6/2015 | Shriber et al. |
| 9,338,215 B2 | 5/2016 | Shriber et al. |
| 9,740,794 B2 | 8/2017 | Bhumkar et al. |
| 2003/0233422 A1* | 12/2003 | Csaszar ................ G06Q 10/107 709/206 |
| 2004/0019611 A1* | 1/2004 | Pearse et al. ............ 707/104.1 |
| 2005/0165615 A1 | 7/2005 | Minar |
| 2005/0289468 A1 | 12/2005 | Kahn et al. |
| 2006/0073812 A1 | 4/2006 | Venkata et al. |
| 2006/0095507 A1 | 5/2006 | Watson |
| 2006/0167860 A1 | 7/2006 | Eliashberg et al. |
| 2006/0173985 A1 | 8/2006 | Moore |
| 2006/0184617 A1 | 8/2006 | Nicholas et al. |
| 2006/0190616 A1 | 8/2006 | Mayerhofer et al. |
| 2006/0217126 A1 | 9/2006 | Sohm et al. |
| 2006/0230061 A1 | 10/2006 | Sample et al. |
| 2007/0043617 A1* | 2/2007 | Stein ................ G06Q 30/0267 705/14.64 |
| 2007/0083520 A1 | 4/2007 | Shellen et al. |
| 2007/0083536 A1 | 4/2007 | Darnell et al. |
| 2007/0118794 A1 | 5/2007 | Hollander et al. |
| 2007/0156809 A1 | 7/2007 | Dickinson et al. |
| 2007/0174389 A1 | 7/2007 | Armstrong et al. |
| 2007/0198526 A1 | 8/2007 | Pitkow |
| 2007/0225047 A1 | 9/2007 | Bakos |
| 2008/0021880 A1* | 1/2008 | Ren ........................ G06F 17/241 |
| 2008/0071929 A1 | 3/2008 | Motte et al. |
| 2008/0126476 A1 | 5/2008 | Nicholas et al. |
| 2008/0215589 A1 | 9/2008 | Elhaik |
| 2008/0235594 A1 | 9/2008 | Bhumkar et al. |
| 2008/0256443 A1 | 10/2008 | Li et al. |
| 2008/0294632 A1 | 11/2008 | Chang et al. |
| 2008/0313215 A1* | 12/2008 | Beker ............... G06F 17/30882 |
| 2009/0144272 A1 | 6/2009 | Adarsh et al. |
| 2009/0217196 A1* | 8/2009 | Neff et al. .................... 715/799 |
| 2009/0299824 A1 | 12/2009 | Barnes, Jr. |
| 2010/0011282 A1* | 1/2010 | Dollard ................ G06F 17/241 715/233 |
| 2010/0023506 A1 | 1/2010 | Sahni et al. |
| 2010/0088170 A1* | 4/2010 | Glore, Jr. ................... 705/14.19 |
| 2010/0125541 A1* | 5/2010 | Wendel ................ G06F 9/4443 706/47 |
| 2010/0199340 A1 | 8/2010 | Jonas et al. |
| 2010/0257184 A1 | 10/2010 | Uy |
| 2010/0262597 A1 | 10/2010 | Han |
| 2010/0280860 A1 | 11/2010 | Iskold et al. |
| 2010/0312771 A1 | 12/2010 | Richardson et al. |
| 2010/0313252 A1 | 12/2010 | Trouw |
| 2011/0043652 A1* | 2/2011 | King et al. .................. 348/222.1 |
| 2011/0161413 A1* | 6/2011 | Cierniak ............. G06F 17/3089 709/203 |
| 2011/0179020 A1 | 7/2011 | Ozzie et al. |
| 2011/0184960 A1 | 7/2011 | Delpha et al. |
| 2011/0238508 A1 | 9/2011 | Koningstein |
| 2012/0102048 A1 | 4/2012 | Heer |
| 2012/0158753 A1 | 6/2012 | He et al. |
| 2012/0159635 A1* | 6/2012 | He et al. ......................... 726/26 |
| 2012/0166453 A1 | 6/2012 | Broder |
| 2012/0239639 A1 | 9/2012 | Shriber et al. |
| 2012/0240030 A1 | 9/2012 | Shriber et al. |
| 2015/0256591 A1 | 9/2015 | Shriber et al. |
| 2016/0239526 A1 | 8/2016 | Shriber et al. |

\* cited by examiner

Roomster — roommate search service, roommate finder, roommates wanted — Internet Explorer, optimized for Bing and MSN BBC http://www.roomster.com/

SW | Roomster.com | roommate search service, ro.... X

← 450

Roomster
Roomster - the best service since features & largest community on Shares, Apartments & Sublets.
A every minute!

Check out our blog!
sign up for a free account or sign in

Post your vacancies for free
Are you an apartment manager, broker, owner or sub-lessor?
Post your rentals for Free.
Add, Edit or Delete them with 24hr access
Sign up for a free account or sign in

SLANGWHO

@roomster.com
Welcome to Roomster Reviews. Find reviews, comments, and updates about Roomster and Roommates. We are the — 445
world's largest online social network, the largest community
http://www.roomster.com/ ← 425

1 comment     1 like   0 dislikes

Wan Di
Dec 19, 12:45 AM   awesome! i cannot believe it i love it sooooo much — 455

👍 Like   👎 Dislike   = Neutral   Share

ADDED TO S
SLANGWHO SEARCH:
syria
suicide
attack
kills
bombings 1 comments   1 likes   0 dislikes   1st

Fig. 4D

SYSTEMS AND METHODS FOR ENABLING A USER TO OPERATE ON DISPLAYED WEB CONTENT VIA A WEB BROWSER PLUG-IN

RELATED APPLICATIONS

This application claims the benefit of U.S. Provisional Application Ser. No. 61/452,595, filed Mar. 14, 2011, which is incorporated herein by reference in its entirety.

FIELD

The present disclosure relates to web pages, and more specifically to enabling a user to operate on displayed web content via a web browser plug-in.

BACKGROUND

Web content accessible via the Internet includes web pages, videos, photographs, blogs, news, media, songs, etc. Sharing web content between users is often tedious, as the user typically has to attach the content to an email and then send the email to an individual. Further, most web sites do not allow a user to act upon web content, such as indicate whether the user has a preference for the web content, rate the web content, rank the web content in relation to other web content, comment on the web content, etc.

SUMMARY

There remains a need for a user to be able to operate or act upon web content that is displayed by the user's web browser. In one aspect, a server computer transmits a plug-in module to a web browser of a client computer. The web browser displays web content in a main window. The plug-in module, when activated, causes the web browser to display a user interface to a user of the client computer. The user interface is separate from the main window of the web browser, displays at least a portion of the web content, and is configured to enable the user to operate on the displayed at least a portion of the web content.

In one embodiment, the user interface is further configured to enable the user to provide a rating for the web content, to provide a comment for the web content, to submit the web content to a search engine, and/or to identify the web content for submission to the search engine. In one embodiment, the user interface is further configured to transmit a URL of the displayed web content to the server computer for extraction of the displayed at least a portion of the web content. In one embodiment, the server computer extracts the at least a portion of the web content from the displayed web content after receiving the URL. In one embodiment, the user interface is further configured to enable the user to post at least some of the web content to a social networking site. In one embodiment, the displaying of the at least a portion of the web content further comprises displaying representative information of the web content selected from a group of representative information types consisting of a picture, an icon, a sentence, and a paragraph in the web content.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIGS. 3A-3F are exemplary screen shots of a user interface and a plug-in module when a web page is added to the server computer via the plug-in module in accordance with an embodiment of the present disclosure;

FIGS. 4A-4F are exemplary screen shots of the user interface and the plug-in module when a web site is added to the server computer via the plug-in module in accordance with an embodiment of the present disclosure.

DESCRIPTION OF EMBODIMENTS

Figure 1:
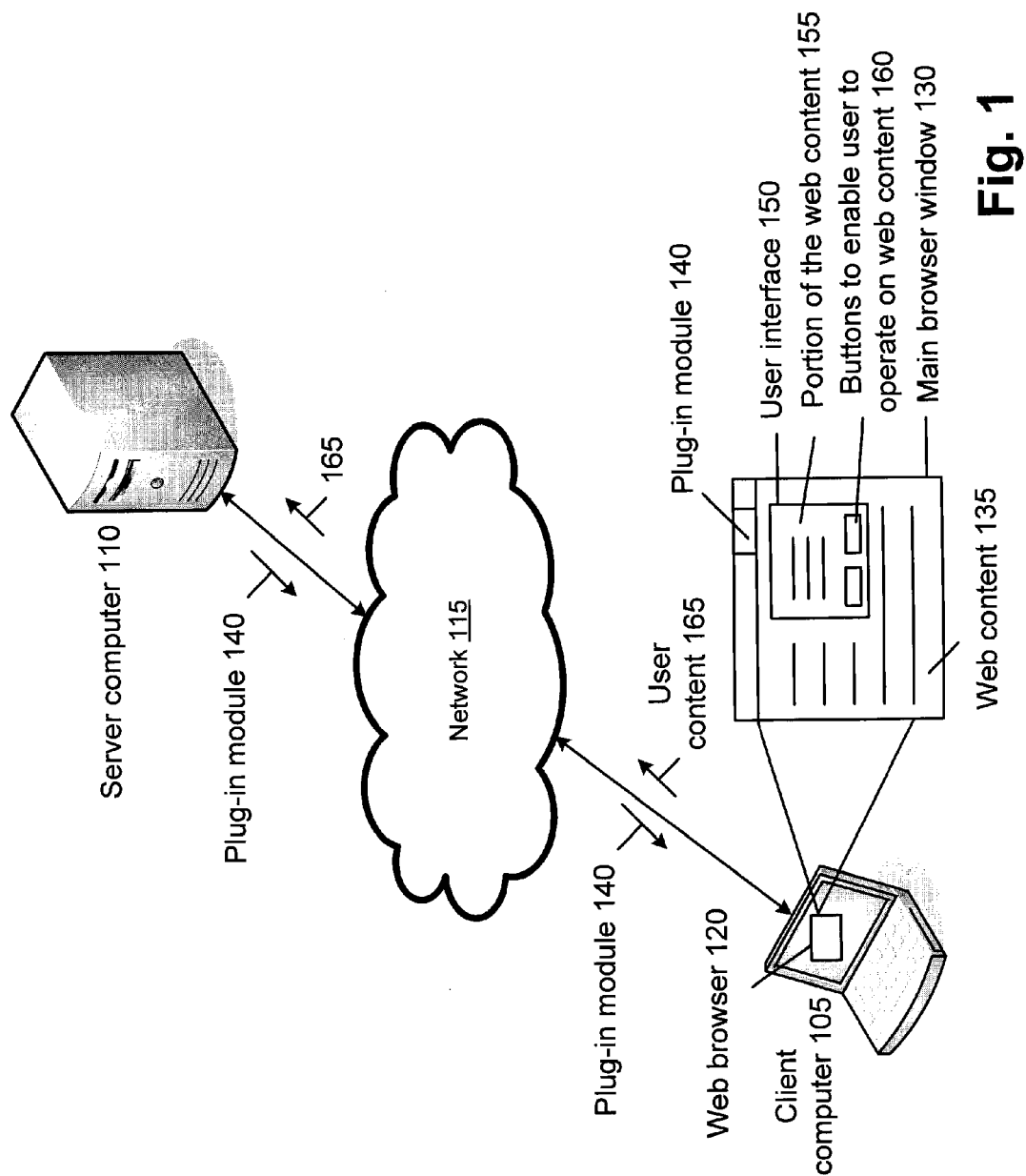
FIG. 1 is a block diagram of a client computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. Fore example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a block diagram of an embodiment of a client computer 105 communicating with a server computer 110 over a network 115 such as the Internet. A user uses a web browser 120 on the client computer 105 to access the Internet. In one embodiment, a web page is transmitted via the network 115 to the client computer 105 for display by the web browser 120 in a main browser window 130. The web browser 120 displays web content 135 in the main window 130 of the web browser 120. The web content 135 is generally received from a third party server different from the server computer 110 without going through the server computer 110. The third party server is generally independent from the server computer 110; and the presentation of the web content from the third party server to the web browser 120 is made without a reference to the server computer 110. However, the techniques described herein also apply to the scenario in which the web content 135 is from the server computer 110.

In one embodiment, the client computer 105 submits a request to the server computer 110 (e.g., via the web content 135) for a plug-in module 140. The plug-in module 140 may be associated with the web content 135, may be associated with another web page, and/or may be associated with a displayed advertisement. The server computer 110 transmits the plug-in module 140 to the browser 120 (to install the plug-in module 140 on the browser 120). In one embodiment, the plug-in module 140 is installed on the browser to present a user interface element such as a button on a toolbar of the web browser 120 (e.g., the browser toolbar or a third party toolbar) or a menu item in the browser 120, etc.

The user of the client computer 105 can activate the plug-in module 140 by, for example, selecting the button for the plug-in module 140 (e.g., via a mouse cursor, touching the button, speaking a command, etc.). In one embodiment, upon activation, the plug-in module 140 causes the web browser 120 to display a user interface 150 separate from the main browser window 130 (e.g., a pop-up window). In one embodiment, the user interface 150 displays at least a portion of the web content 155 to the user and enables the user to operate on the displayed web content 155 (and, e.g., generate user content associated with the web content 135, such as a rating, comment, etc. as described below). In one embodiment, the user interface 150 includes one or more buttons 160 to enable the user to operate on the portion of the web content 155. In one embodiment, the plug-in module 140 transmits user content 165 to the server computer 110 (e.g., for indexing).

For purposes of this disclosure, a computer such as the client computer 105 includes a processor and memory for storing and executing program code, data and software. Computers can be provided with operating systems that allow the execution of software applications in order to manipulate data. Client computer 105 can be any device that can display a website and that can be used by a user. Personal computers, servers, personal digital assistants (PDAs), wireless devices, smartphones, cellular telephones, tablet computers, internet appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Wash., or the Ubuntu operating system distributed by Canonical Ltd. of Douglas, Isle of Man.

In one embodiment, the server computer 110 is a group of servers, such as one server to receive the submitted user content transmitted from the plug-in module 140 and a second server configured to download/install the plug-in module 140 into the user's web browser 120. In another embodiment, server computer 110 performs both of these functions. In one embodiment, a third server may be present in FIG. 1 representing a third party web server on the Internet (e.g., an online newspaper site, a blog, etc.) that is separate and distinct from server computer 110.

Figure 2:
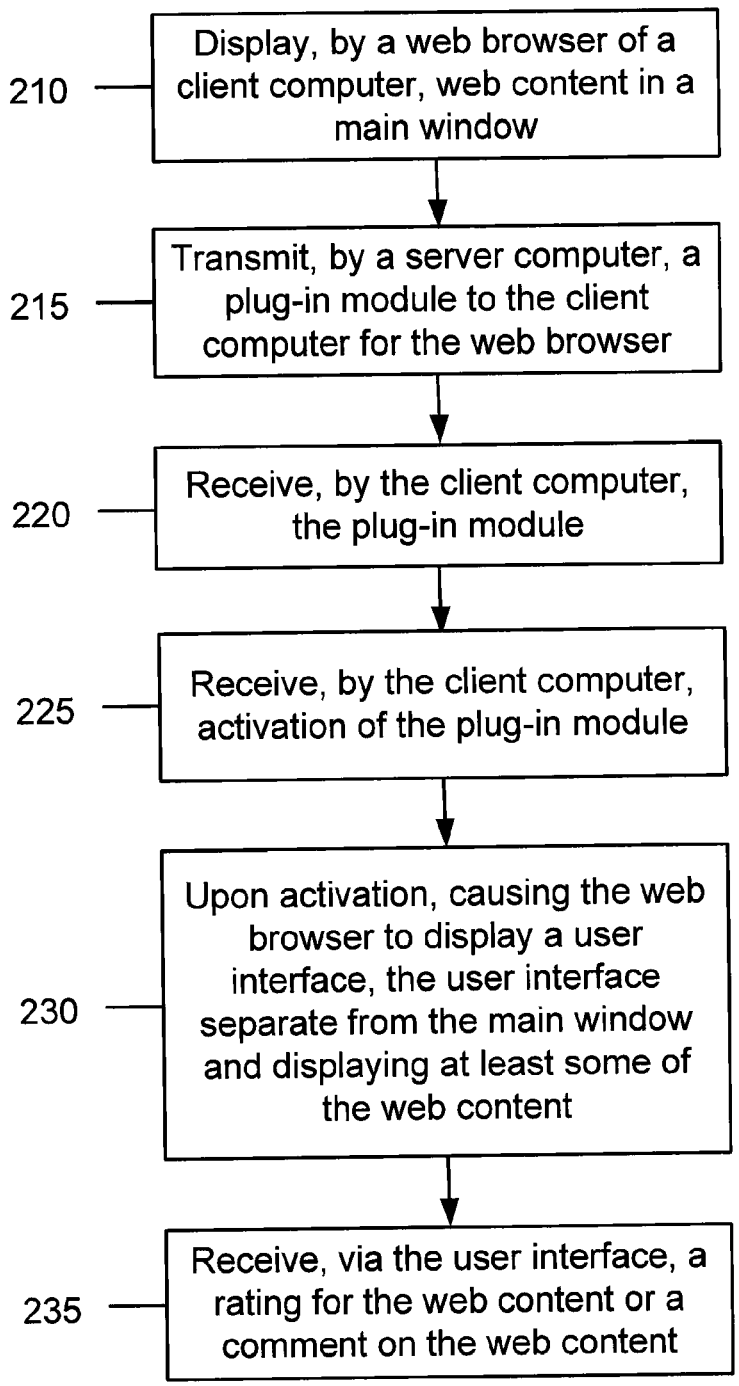
FIG. 2 is a flowchart illustrating operations performed by the server computer and the client computer to enable a user of the client computer to operate on web content displayed by the client computer in accordance with an embodiment of the present disclosure.

FIG. 2 is a flowchart illustrating an embodiment of operations performed by the server computer 110 and the client computer 105 to enable a user of the client computer 105 to operate on web content displayed by the browser 120. The user uses the web browser 120 to view and/or listen to web content 135, such as a web page, an audio file, a video, a post, a media file, etc., in main browser window 130 (Operation 210). In one embodiment, the plug-in module 140 is installed prior to and independent from the web content 135; the installation of the plug-in module 140 and its operation requires no prior arrangement made in the web content 135; and thus, the plug-in module 140 can work with any web content 135 found in the web. Alternatively, the web content 135 (e.g., a web page associated with the server computer 110) enables the user to install plug-in module 140. In another embodiment, the web page 135 is a third party web page that includes an advertisement to install the plug-in module 140.

The server computer 110 transmits the plug-in module 140 to the web browser 120 of the client computer 105 (Operation 215) and the client computer 105 receives the plug-in module 140 (Operation 220). In one embodiment, the plug-in module 140 allows the user to remotely log into the server computer 110. Upon activation of the plug-in module 140 (Operation 225), the plug-in module 140 causes the web browser 120 to display user interface 150 separate from the main window 130. In one embodiment, the user interface 150 displays at least a portion of the web content 155 that the web browser 120 is displaying in its main window 130 (Operation 230). For example, the user interface 150 can display representative information of the web content 135, such as a picture, an icon, a sentence, and/or a paragraph in the portion of the web content 155. In one embodiment, the user interface 150 displays notifications, comments, or reviews from other users who have downloaded the plug-in module 140.

In one embodiment, the user interface 150 automatically selects for display the portion of the web content 155 from the received web content 135. Further, in one embodiment the user of the client computer 105 can provide settings as to what the user interface 150 will display when web content 135 is displayed in the web browser 120 (e.g., display the first few sentences of the web content 135, display the first graphic and first few sentences of web content 135, display the entire web page 135, etc.)

The plug-in module 140 enables the user to operate on the web content 155. For example, the user can submit a rating for the web content 155 or a comment on the web content 155 (Operation 235) (e.g., user content 165). In one embodiment, the user interface 150 enables the user to post the portion of the web content 155 to a social networking site (e.g., FACEBOOK®). In one embodiment, the user interface 150 displays current discussions related to the web content 155 and enables the user to add the web content 135 to a search engine associated with the server computer 110. In one embodiment, the user can use the user interface 150 to adjust (e.g., add web content to or remove web content from) the portion of the web content 155 displayed by the user interface 150. For example, the plug-in module 140 can transmit the URL of the web content 135 to the server computer 110. The server computer 110 can update what is displayed by or the amount of web content 155 displayed by the user interface 150. In one embodiment, the plug-in module 140 prompts the user to add the web page 135 to the server computer's index so that the web page 135 will be present in future search results. The plug-in module 140 may transmit the URL of the web page 135 to the server computer 110 (which can then extract the web content 135), may transmit the entire web page 135 to the server computer 110, or may transmit a portion of the web page 135 to the server computer 110. In one embodiment, the server computer 110 (or the plug-in module 140) grabs the web page's meta-tags, thumbnail, title, and/or text of the web page 135. In one embodiment, the plug-in module 140 allows the user to add web content 135 (e.g., a web page) to the server computer 110, such as via the user interface 150, a pop-up window, a menu option, right-clicking the webpage itself, via the browser 120, etc. In one embodiment, the plug-in module 140 enables the user to change the web content's tags in case the meta-tags are inaccurate.

Thus, the user interface 150 enables the user to provide information/content about a third party web page 135 to a web page associated with the plug-in module 140 (and server computer 110) while the third party web page 135 is displayed in web browser 120. This information/user content 165 can include one or more comments, tips, a rating for the web content 155 (e.g., a score for the web content 155), an indication that the user likes or dislikes the web content 155, a recommendation for or on the web content 155, and/or a tag for the web content 155. Further, the user interface 150 can enable the user to attach content to the web content 155, share the web content 155 with others, etc.

The plug-in module 140 allows the user to act on any web page that is currently being viewed by the user and, in one embodiment, transmits the user-created content (e.g., comments and ratings) in association with an identification of the web content to the server computer 110. After the plug-in module 140 is installed on the web browser 120 (e.g., via an installation web page that directs the user to download the plug-in module 140 for installation), the user can visit any third party web site and click a button associated with the plug-in module 140 to create user content in association with the third party web site and submit the user content to the server computer 110. The user does not have to visit the web site through the plug-in module 140 or user interface 150 but rather can navigate to the web site using the user's web browser 120. In one embodiment, the plug-in module 140 can be implemented as a built-in module of the web browser 120 (e.g., shipped by Microsoft Corporation as a built-in component of INTERNET EXPLORER®).

Thus, when a user is looking at a web page (e.g., a news article or a blog entry), and if the user is interested in acting upon it (e.g., to share it, to submit it to the server computer 110 for indexing, or to rank or comment on it), the user can click on the plug-in module button and then work on the user interface 150 that, in one embodiment, populates some of the fields automatically by automatically taking those contents (e.g., snippets) from the web page 135 that the user is currently looking at (e.g., thumbnail image, the lead sentence, etc.). There is no need for any prior arrangement between the web page being acted upon and the plug-in module 140/server computer 110.

For example, a blog-related service may use such a plug-in module 140 to assist the blog author that blogs on news articles. When looking at the news article, the user clicks the plug-in button and the user interface 150 shows the blog template that has many fields pre-populated with content from the news article (e.g., a thumbnail icon image, a lead sentence, etc.). Thus, the user does not have to perform the copy and paste manually. The user can work on the user interface 150 to compose the remaining part of the blog entry about the news article, such as rating, comments, etc.

In one embodiment, the user interface 150 displays advertisements to the user, such as for one or more products. In one embodiment, the advertisements are transmitted to the browser 120 by the server computer 110. Alternatively, a third party advertisement server can transmit advertisements to the user interface 150 for display. In one embodiment, the advertisements may be related to the portion of the web content 155 displayed by the user interface 150. The user interface 150 can also display statistics. For example, the user interface 150 can display statistics associated with the portion of the web content 155, statistics associated with the user (e.g., number of days since the user has downloaded the plug-in module 140, amount of web content that the user has commented on, amount of web content that the user has shared, amount of web content that the user has rated or ranked, number of and/or which other users the user has followed, number of and/or which other users have followed the user, etc.), statistics about the user interface 150, statistics about the plug-in module 140, statistics about other users associated with the plug-in module 140 (e.g., the number of users who have downloaded the plug-in module 140 and/or the number of users who have downloaded the plug-in module 140 and who have currently activated the plug-in module 140 to view a corresponding user interface), and/or statistics about any other information.

In one embodiment, the user interface 150 displays advertisements that are posted by other users who have downloaded the plug-in module 140. The advertisements can be, for example, an advertisement for a roommate, an advertisement to sell or buy a product, a classified jobs section, a dating section, etc. Thus, in one embodiment, a product manager at company XYZ can post a job position that is available at XYZ to the users of the plug-in module 140. As another example, suppose one user is using his web browser 120 to search for a new television set. In one embodiment, the plug-in module 140 can detect the user's searching and post an advertisement for a TV that another user in the community (e.g., another user who has downloaded the plug-in module 140) is selling.

For each web item (web content) (e.g., a web site, a video, a web page) hosted on the web/internet (typically not on the server computer 110), the server computer 110 allows its users to create user content 165, which typically includes a snippet or portion of the web content 155 (such as one or more sentences from the web content 135, one or more thumbnail images of the web content 135, etc.). The snippet 155 is not generated until a user submits it to the server via the plug-in module 140. The user content 165 may further include a set of tags/keywords. The plug-in module 140 and/or the server 110 may automatically select the snippet and the tags/keywords 155 for the user, by processing the web content 135 in an automated way. The snippet and/or the tags/keywords 155 suggested by the plug-in module 140 and/or the server computer 110 may be modified by the user via the user interface 150 of the plug-in module 140. The snippet 155 is stored on the server computer 110 (as part of the user content 165 associated with the web content 135); and in one embodiment the user content 165 has a link to the web content 135, which allows the users of the server computer 110 to follow the link to see the actual/current version of the web content 135 that is on the web (typically not on the server computer 110). One or more users can add additional contents to the "user content" 165 associated with the web content 135, such as a vote/rating, and a comment. The first user submitting the snippet and/or tags/keywords can submit this information with his/her rating/vote and comment.

In one embodiment, if a second user uses a second client computer that has the plug-in installed to visit the web content that has an associated user content (e.g., a snippet, a set of votes by different users and comments) in the server computer, the browser plug-in module shows the availability of the user content (e.g., the numbers of comments the server computer 110 stores for the web content displayed in the main window and the counts of up votes and down votes) and the second user can click on the browser plug-in module to activate a user interface to view the user content and/or provide additional user content. The second user may use a search page of the server computer and/or the user interface of the plug-in module to search, based on the tags, to discover the web content and then view the user content using the plug-in module.

Figure 3A:
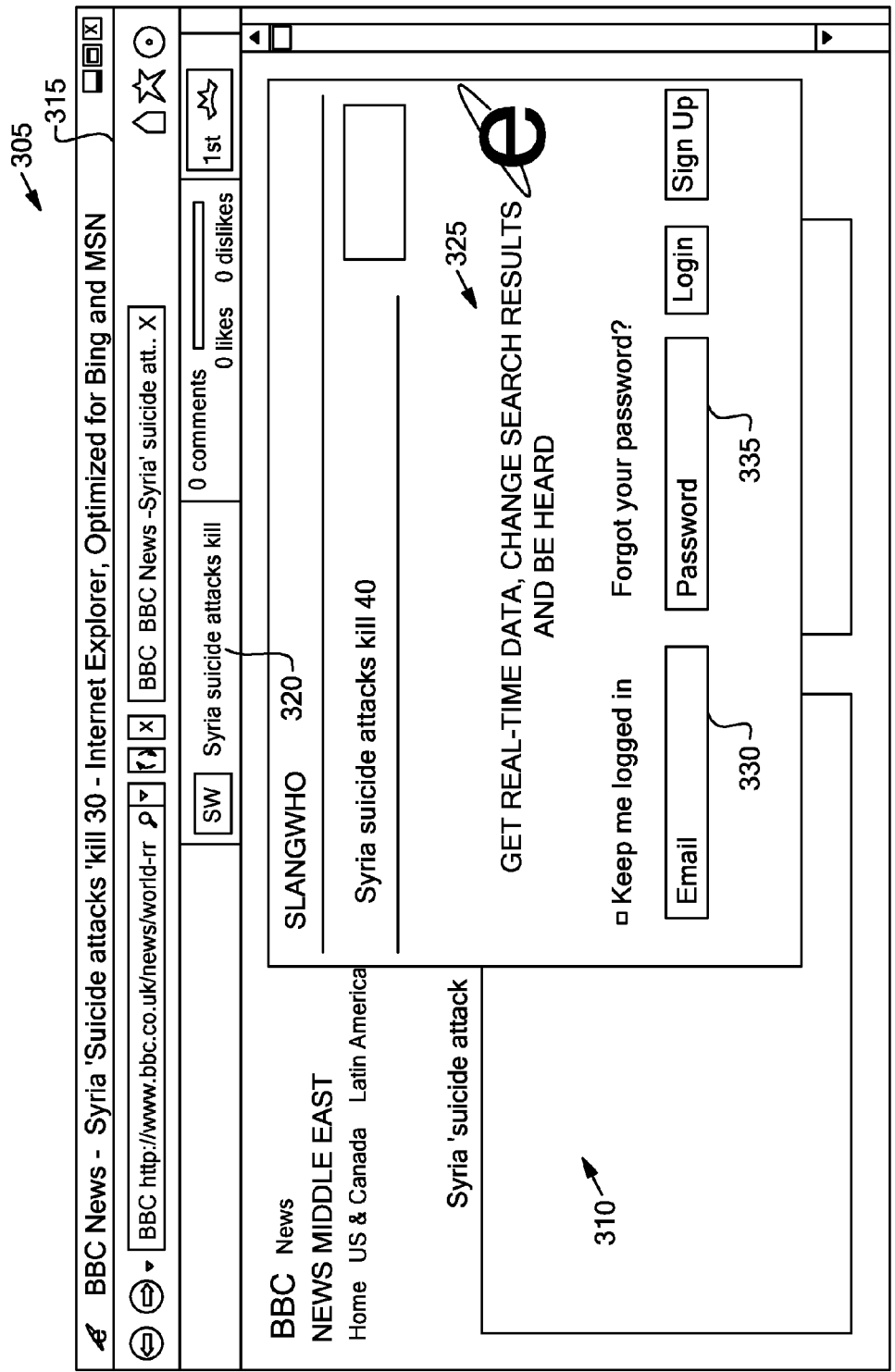
Figure 3B:
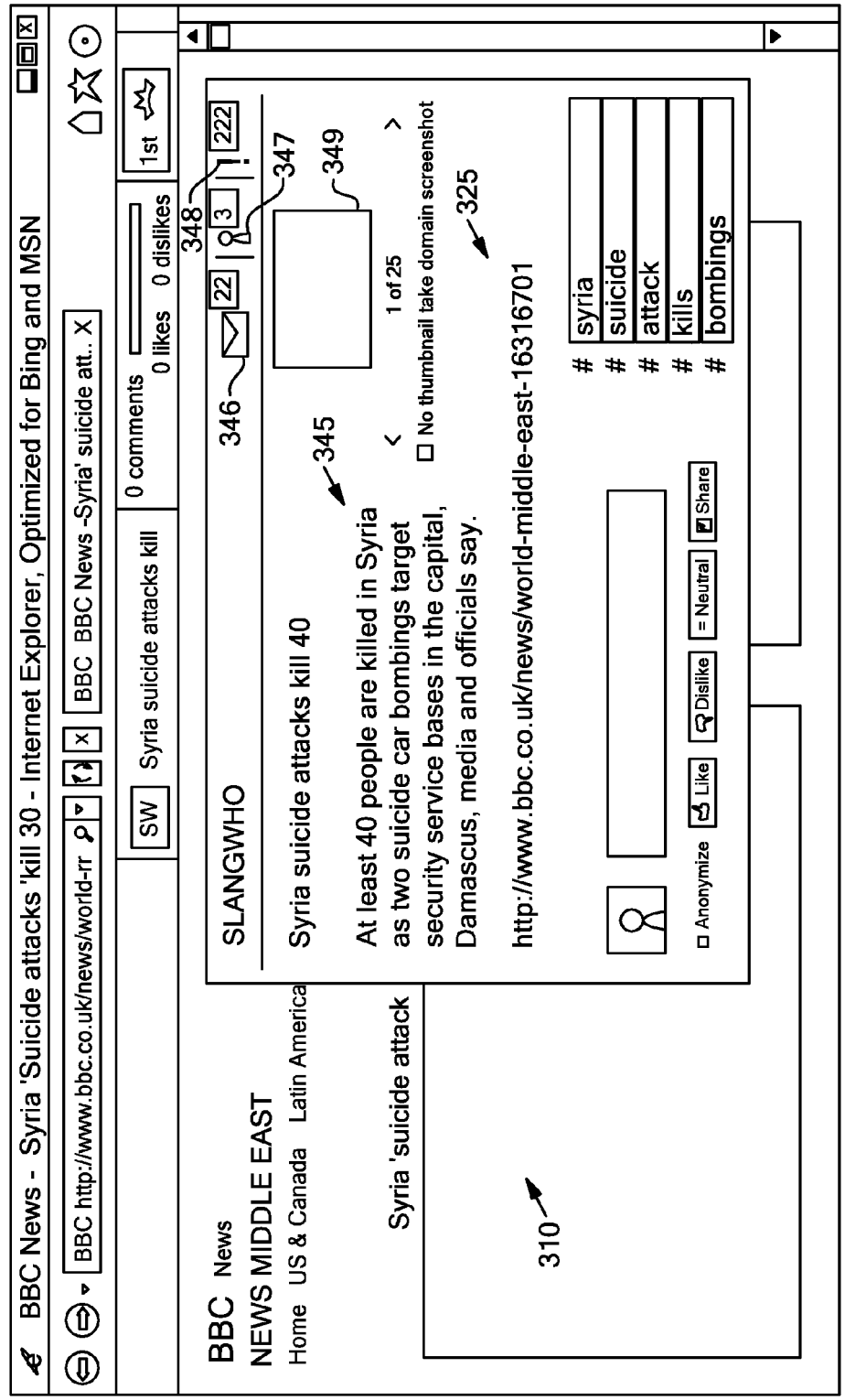
Figure 3C:
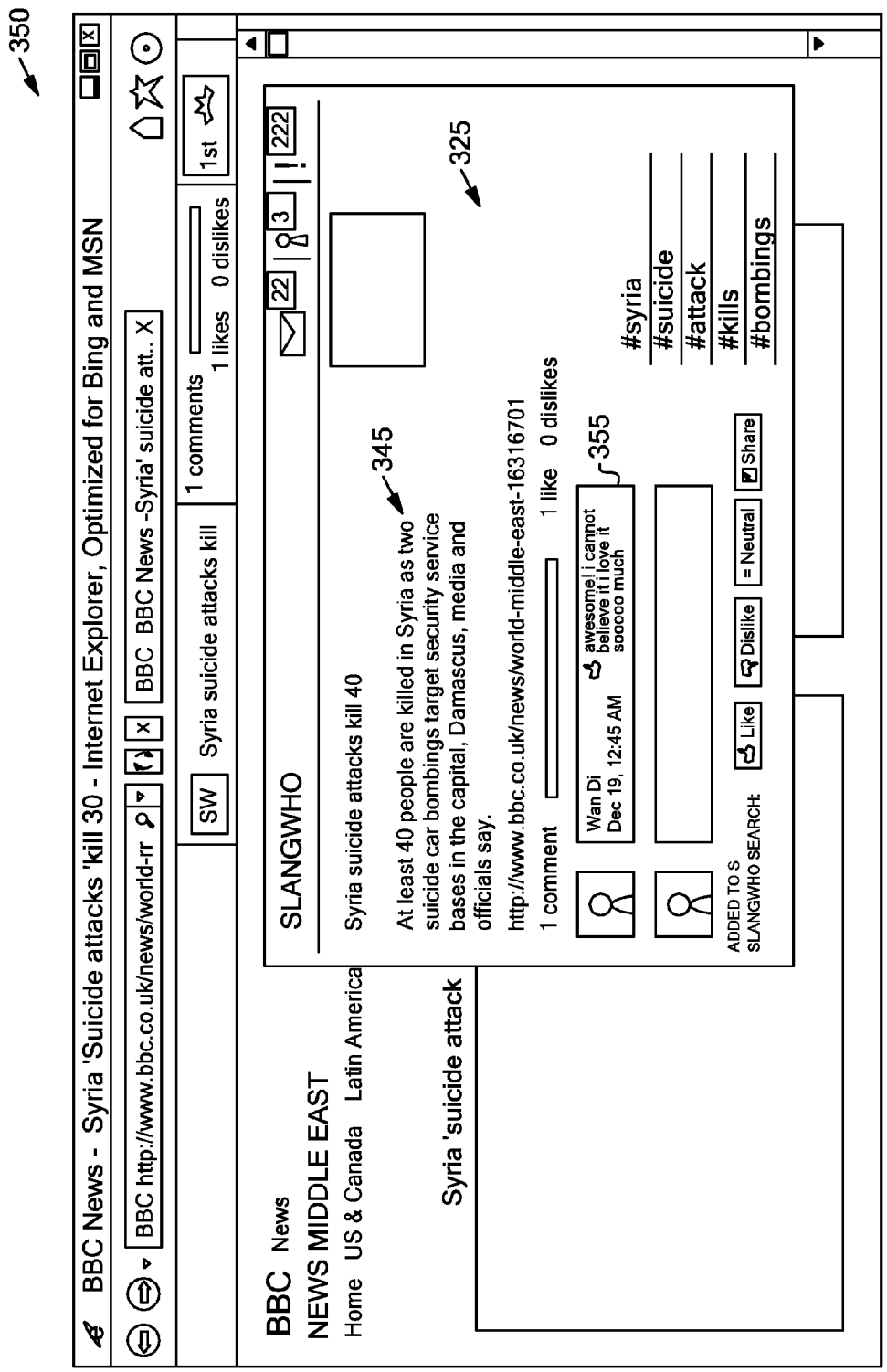
Figure 3D:
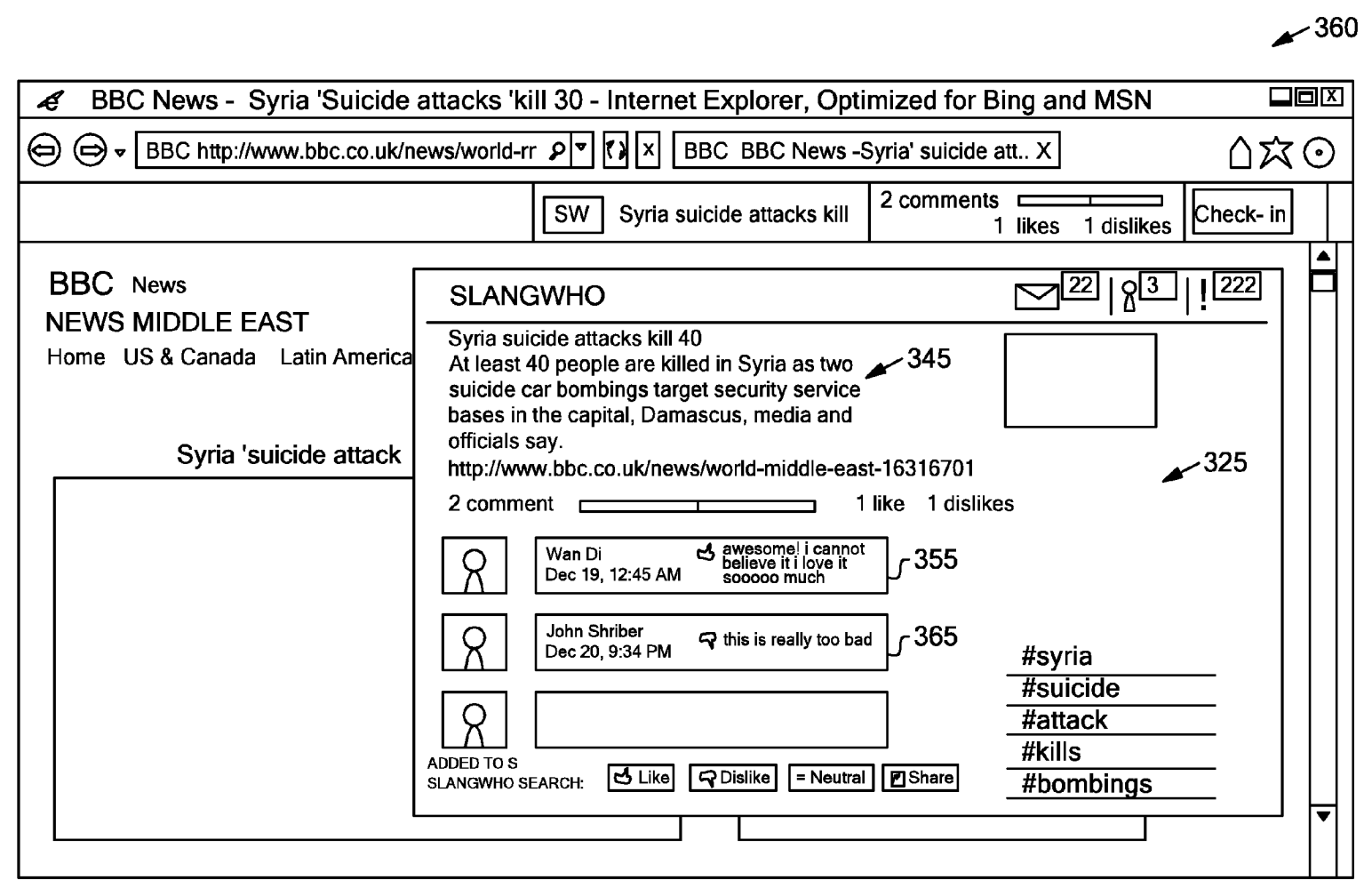
Figure 3E:
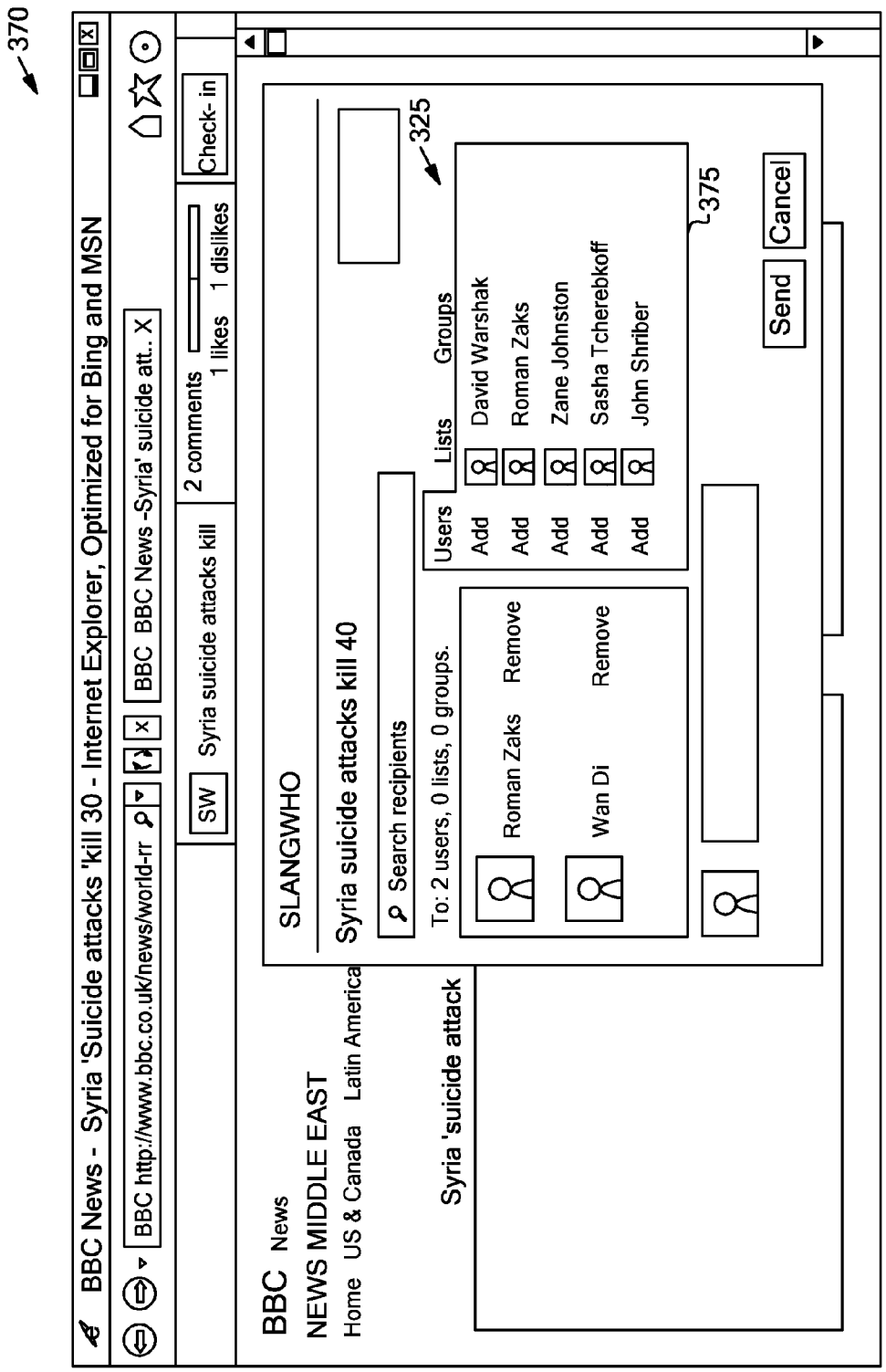
Figure 3F:
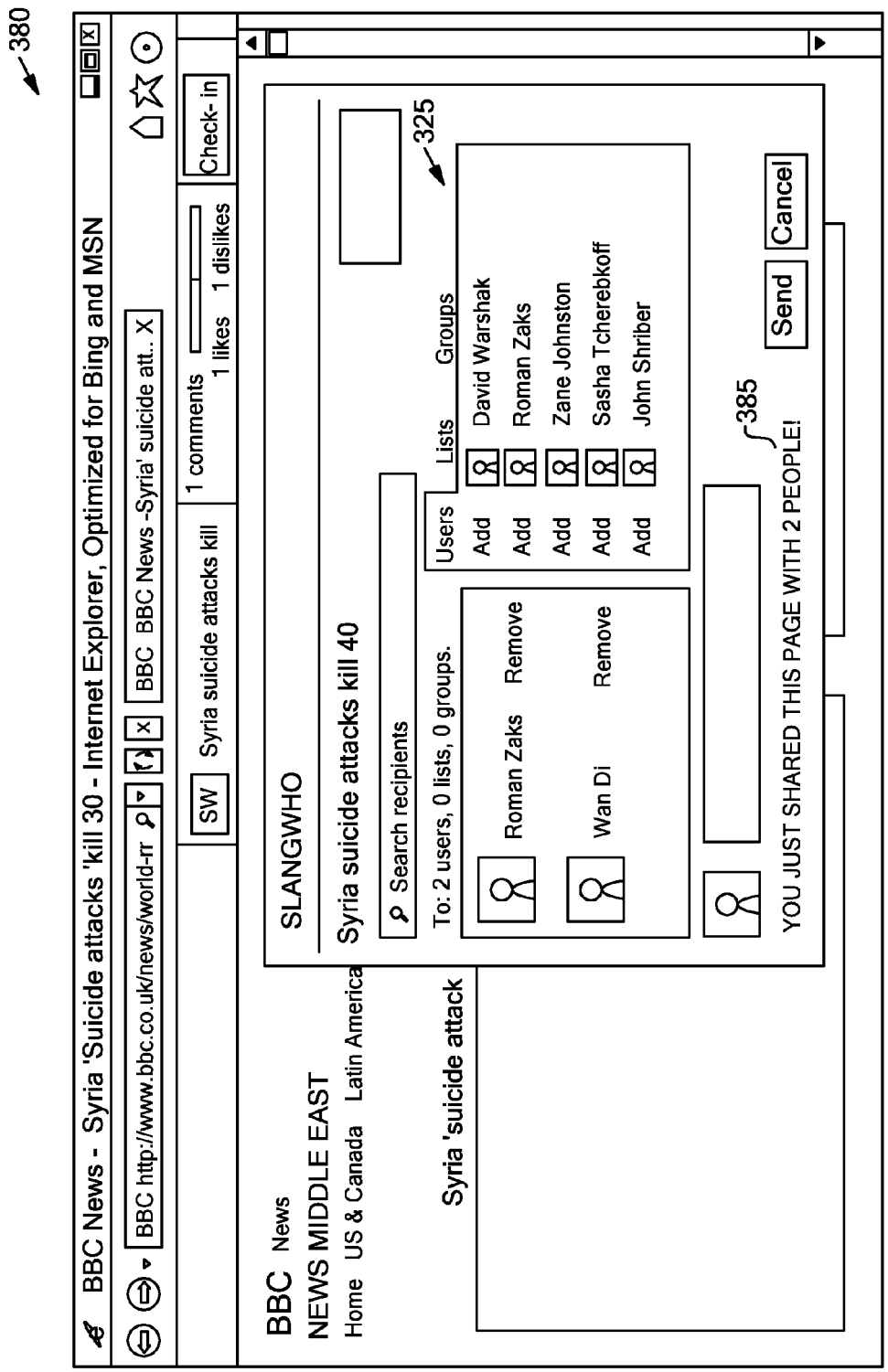

FIGS. 3A-3F are exemplary screen shots of the user interface and the plug-in module when a web page is added to the server computer 110 (e.g., added to be indexed for search results) via the plug-in module. In FIG. 3A, screen shot 305 shows web content 310 being displayed by web browser 315. The user has activated the plug-in module via plug-in module button 320, which results in user interface 325 being displayed. Screen shot 305 shows the user interface 325 enabling the user to log in via log-in input areas 330, 335. FIG. 3B shows a screen shot 340 illustrating the user interface 325 that includes a portion of the web content 345 associated with web content 310. The user in screen shot 340 can enter in a comment relating to the portion of the web content 345. FIG. 3C shows a screen shot 350 that includes user interface 325 having a comment 355 from the user about the portion of the web content 345. The user has indicated that he/she "likes" the web content 345. FIG. 3D is a screen shot 360 of user interface 325 displaying two comments, the like comment 355 and a dislike comment 365. FIG. 3E shows a screen shot 370 with user interface 325 displaying contacts 375 that the user can share the web content 345 with. FIG. 3F shows a screen shot 380 with user interface 325 indicating via notification 385 that the user has shared the web content 345 with two people.

Figure 4A:
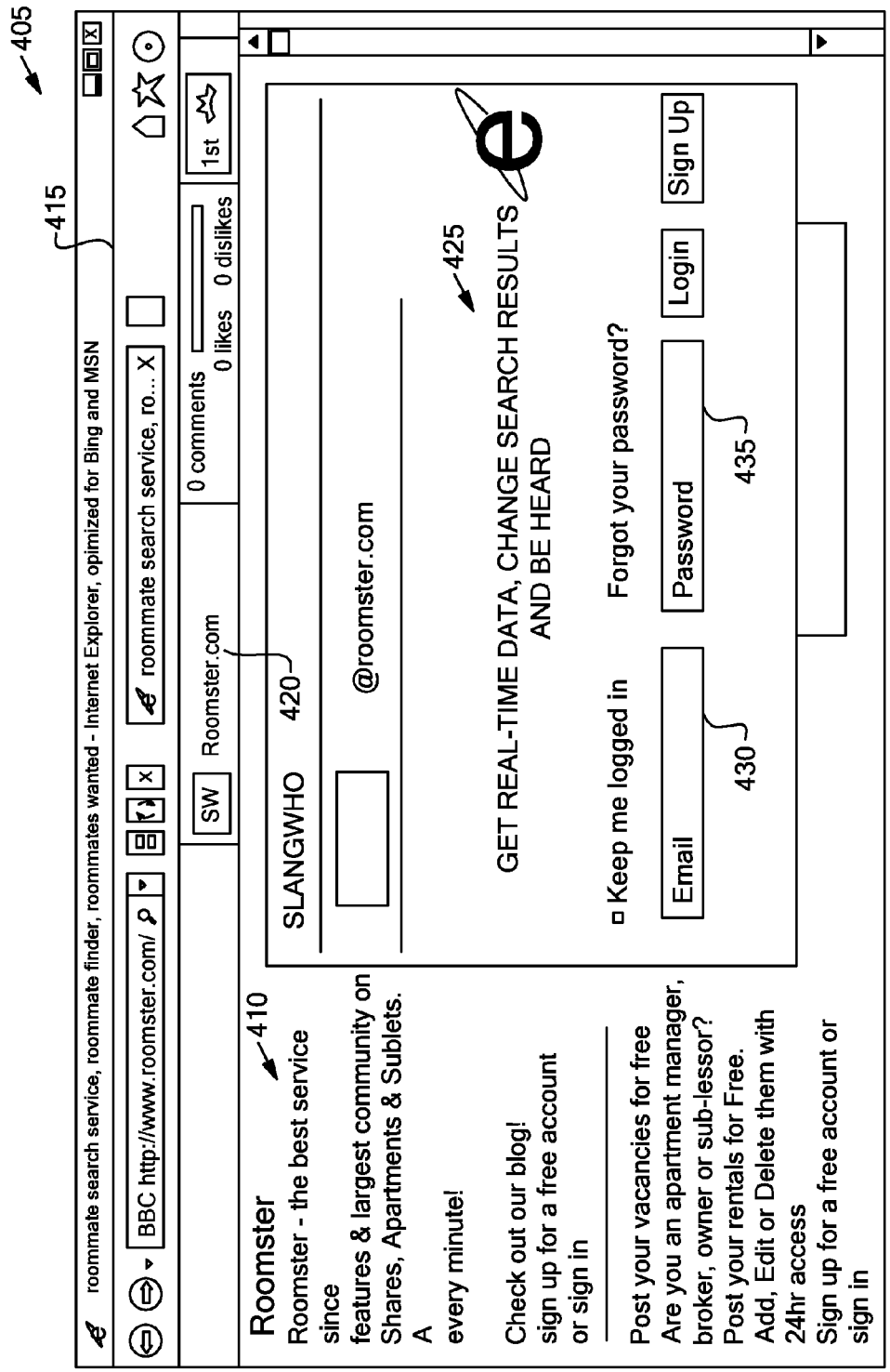
Figure 4B:
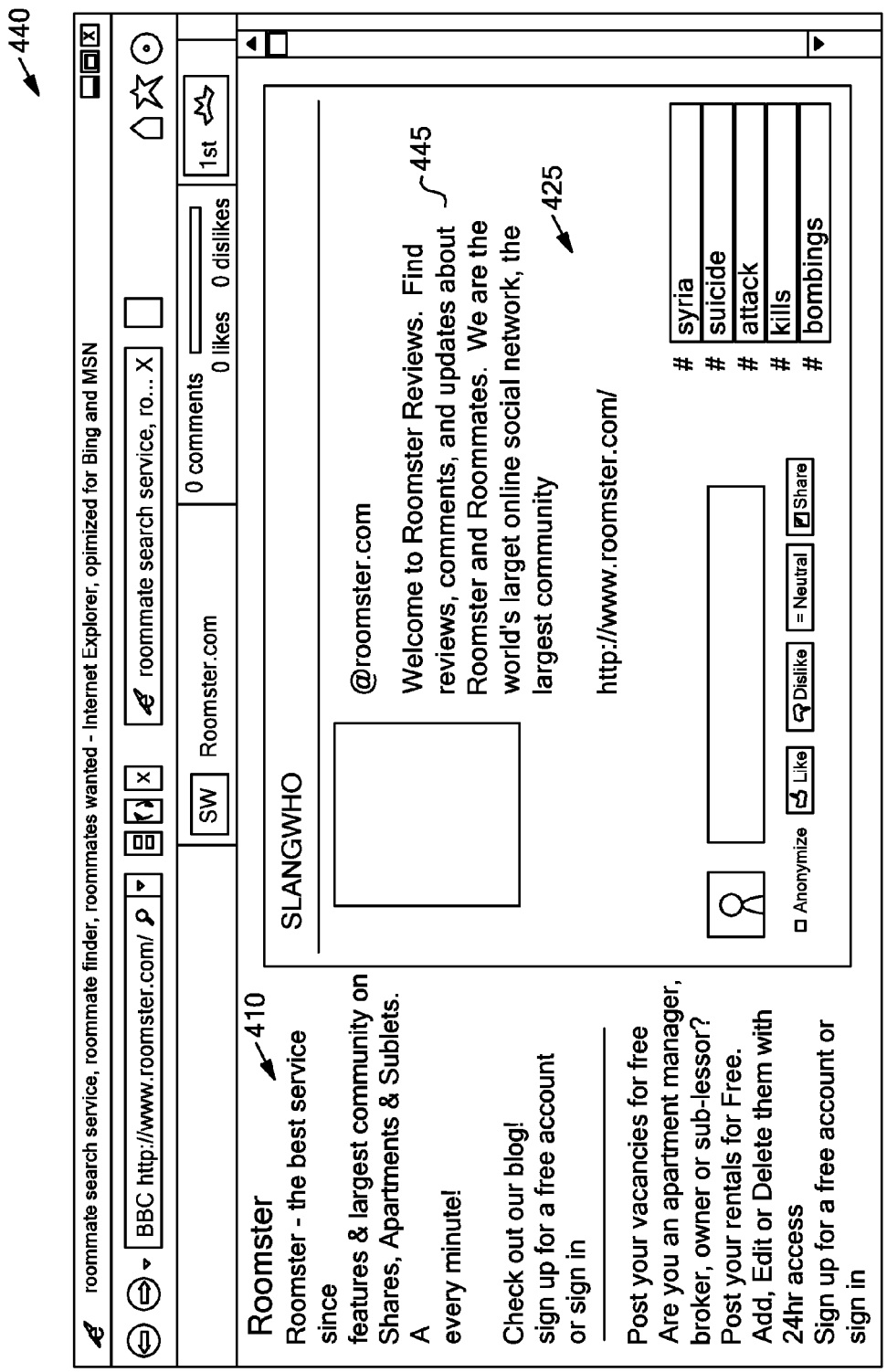
Figure 4D:
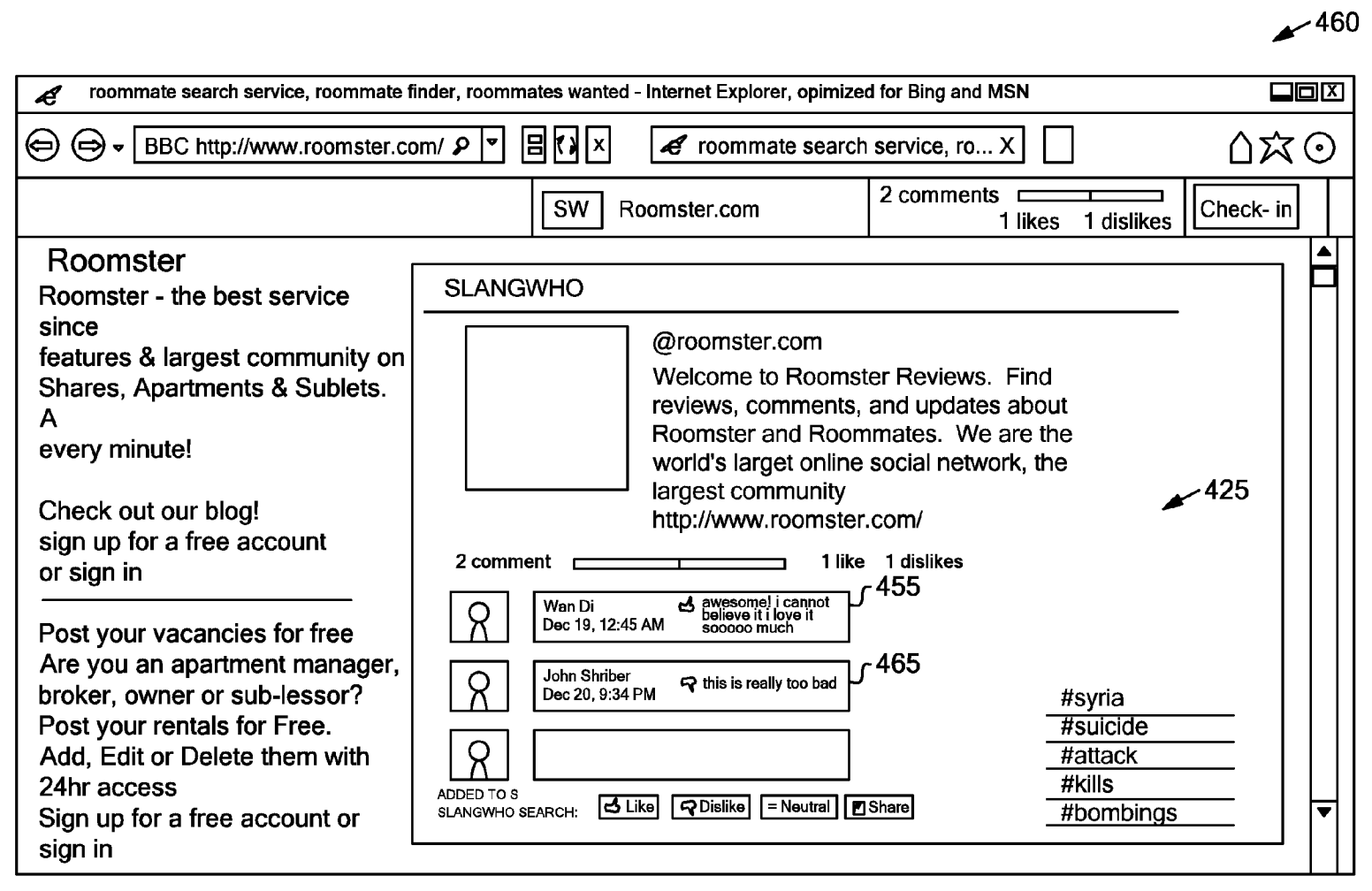
Figure 4E:
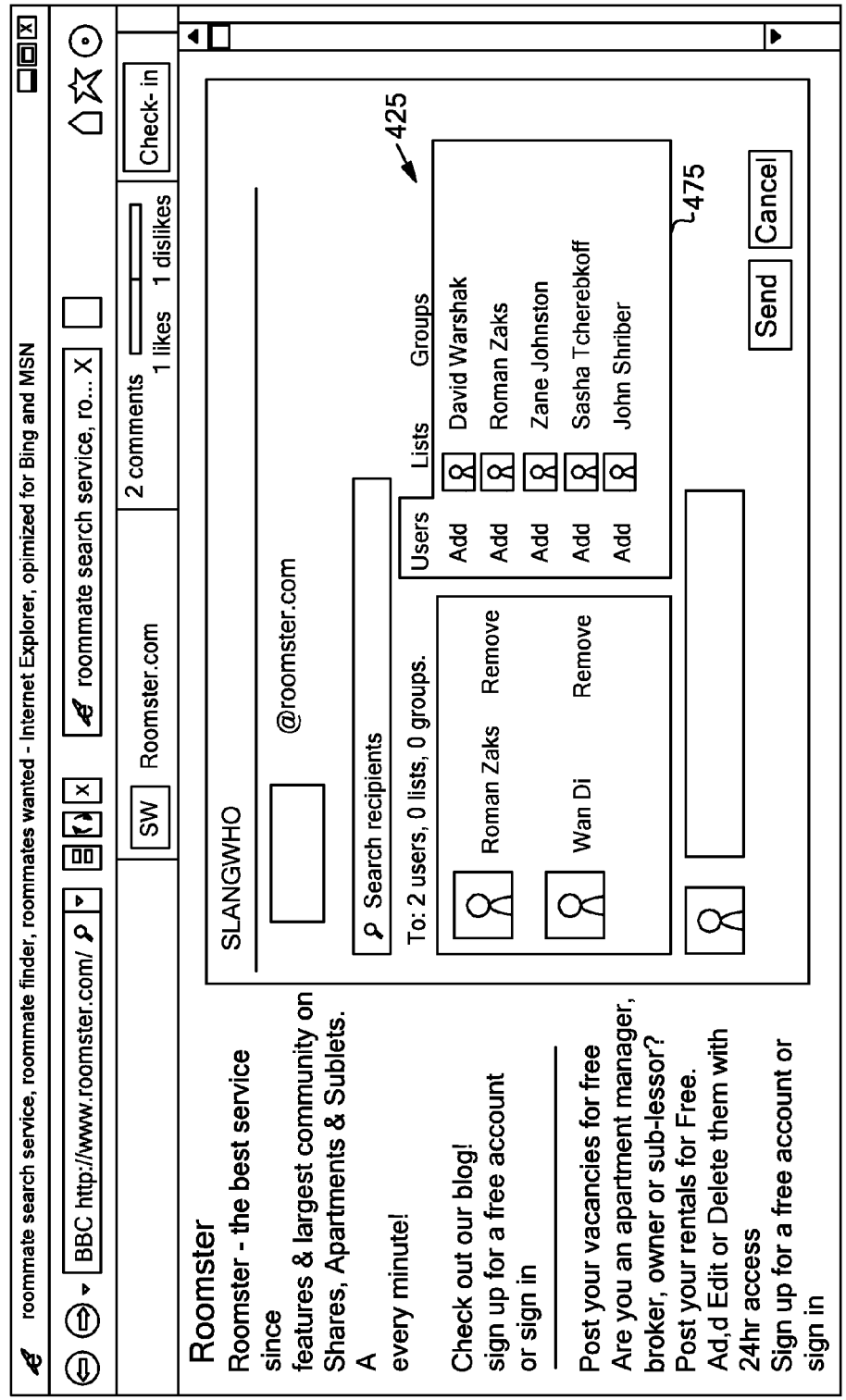
Figure 4F:
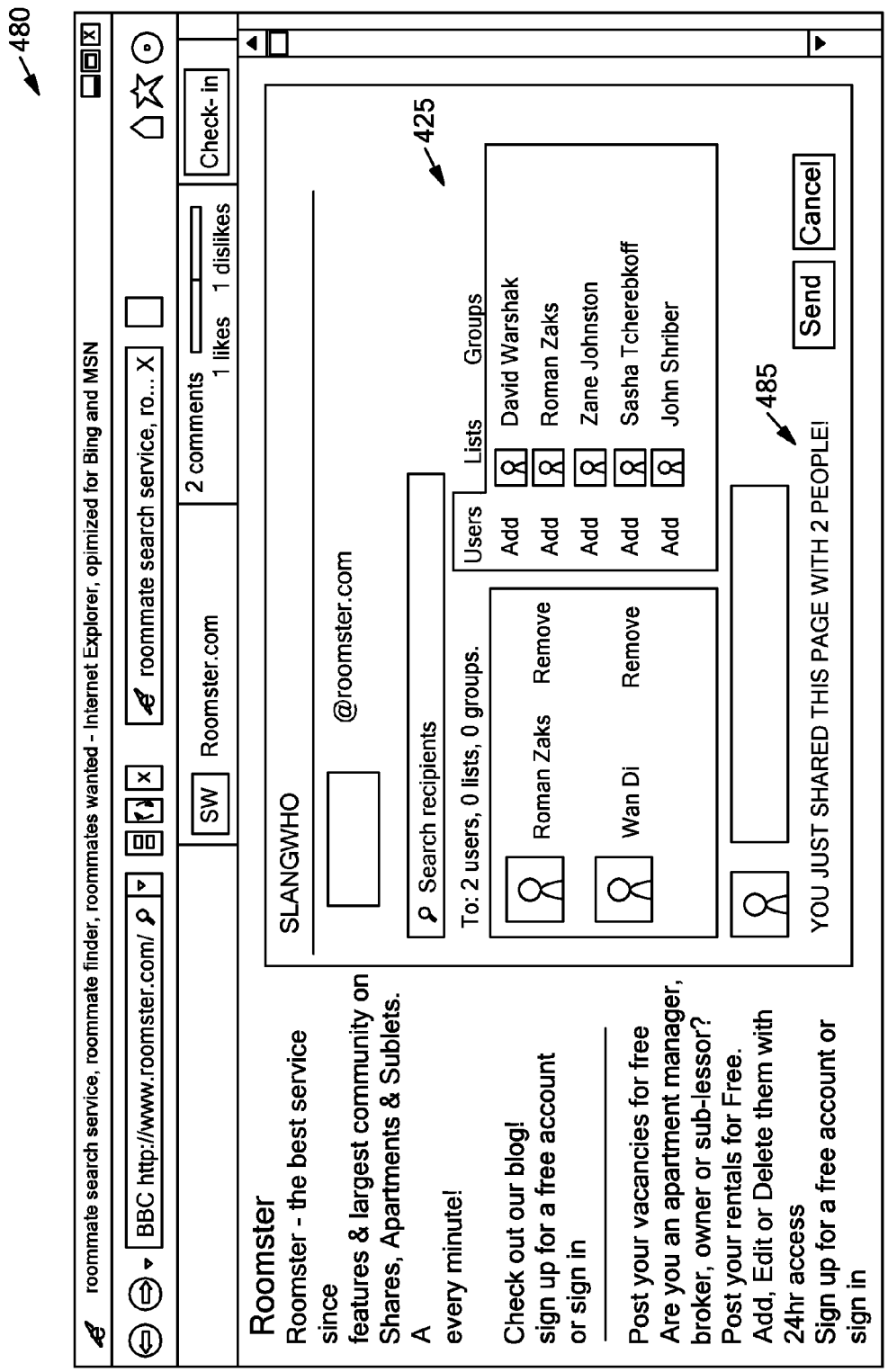

FIGS. 4A-4F are exemplary screen shots of the user interface and the plug-in module when a web site is added to the server computer 110 (e.g., added to be indexed for search results) via the plug-in module. In FIG. 4A, screen shot 405 shows web site 410 being displayed by web browser 415. The user has activated the plug-in module via plug-in module button 420, which results in user interface 425 being displayed. Screen shot 405 shows the user interface 425 enabling the user to log in via log-in input areas 430, 435. FIG. 4B shows a screen shot 440 illustrating the user interface 425 that includes a portion of the web site content 445 associated with web site 410. The user in screen shot 440 can enter in a comment relating to the portion of the web content 445. FIG. 4C shows a screen shot 450 that includes user interface 425 having a comment 455 from the user about the portion of the web site content 445. The user has indicated that he/she "likes" the web site content 445. FIG. 4D is a screen shot 460 of user interface 425 displaying two comments, the like comment 455 and a dislike comment 465. FIG. 4E shows a screen shot 470 with user interface 425 displaying contacts 475 that the user can share the web site content 445 with. FIG. 4F shows a screen shot 480 with user interface 425 indicating via notification 485 that the user has shared the web site content 445 with two people.

Figure 5:
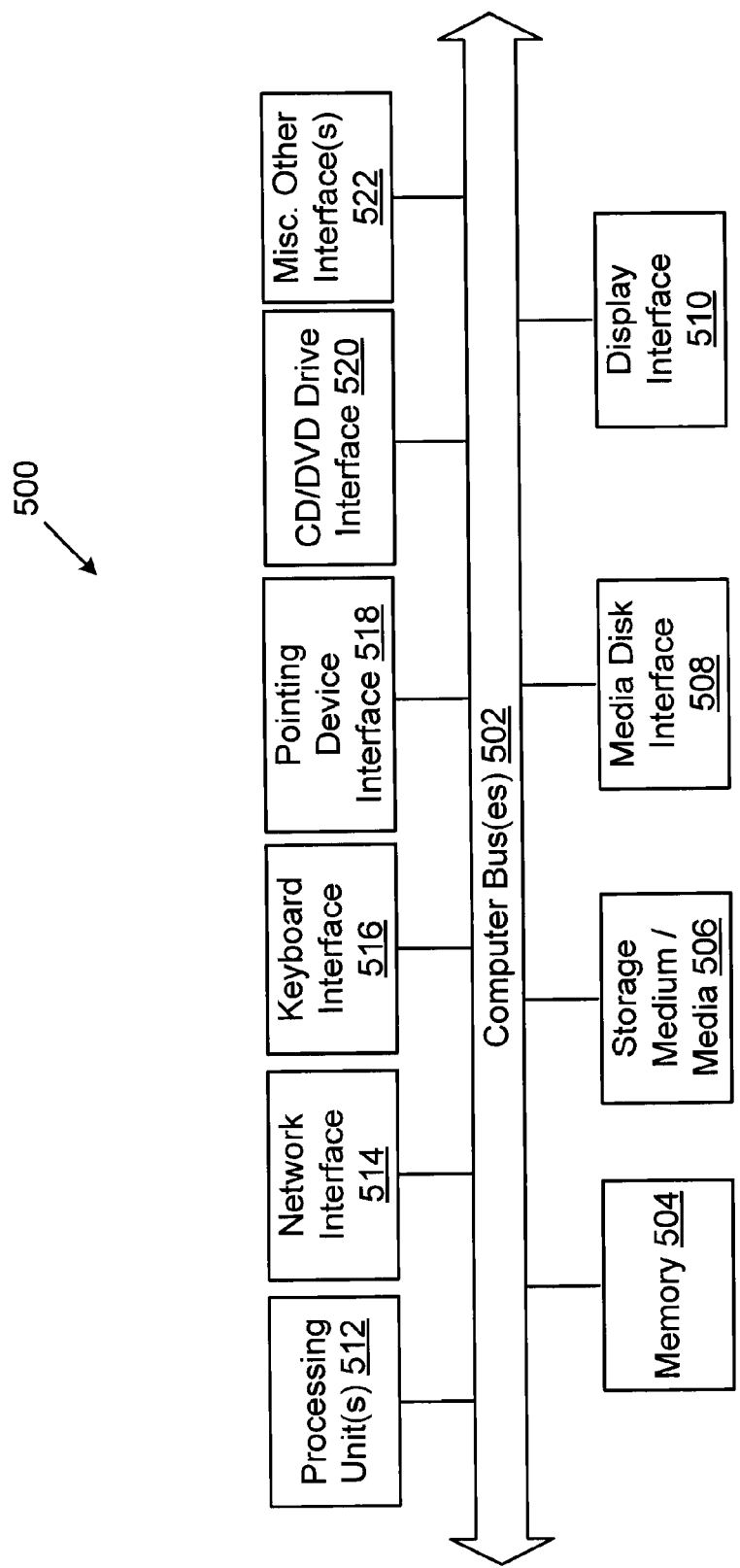
FIG. 5 is a block diagram illustrating an internal architecture of a computer in accordance with an embodiment of the present disclosure.

FIG. 5 is a block diagram illustrating an internal architecture of an example of a computer, such as server computer 110 and/or client computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 5, internal architecture 500 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process operations, incorporating functionality described herein, e.g., one or more of process flows described herein. CPU 512 first loads computer-executable process operations from storage, e.g., memory 504, storage medium/media 506, removable media drive, and/or other storage device. CPU 512 can then execute the stored process operations in order to execute the loaded computer-executable process operations. Stored data, e.g., data stored by a storage device, can be accessed by CPU 512 during the execution of computer-executable process operations.

Persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    transmitting, by a first server computer, a plug-in module to a web browser of a client computer, the web browser displaying web content in a main window from a second server computer,
    wherein the plug-in module, when activated, causes the web browser to display a user interface to a user of the client computer, wherein the user interface is separate from the main window of the web browser,
    wherein the user interface automatically selects a portion of the web content based on settings received from the user via the user interface that include settings to display one or more of the following from the web content: a picture, an icon, a sentence, and a paragraph,
    wherein the user interface is configured to transmit, to the first server computer, user-created content in association with an identification of the web content,
    wherein the user interface is configured to display content associated with the web content from the second server computer, delivered by the first server computer, from other users who have downloaded the plug-in module,
    wherein the user interface displays the portion of the web content within the user interface, and
    wherein the user interface is configured to enable the user to:
        operate on the portion of the web content displayed in the user interface,
        adjust the portion of the web content displayed in the user interface, wherein adjusting the portion of the web content comprises adding content to the portion of web content, removing content from the portion of web content, or modifying the portion of web content, and
        post the user content generated based on an adjustment of the portion of the web content;

adding, by the first server computer, the web content to an index of web content, the indexing storing the URL of the web content;

associating, by the first server computer, the user content with the web content in the index;

transmitting, by the first server computer, the plug-in module to a second client computer;

receiving, at the first server computer, a URL from the plug-in module at the second client computer;

identifying, by the first server computer, the web content in the index based on the URL received from the second client computer; and transmitting, by the first server computer, an advertisement including the user content associated with the indexed web content to the second client computer for display.

2. The method of claim 1, wherein the transmitting of the plug-in module further comprises transmitting the plug-in module to the web browser to cause the web browser to display the user interface, the user interface further configured to enable the user to provide a rating for the web content.

3. The method of claim 1, wherein the transmitting of the plug-in module further comprises transmitting the plug-in module to the web browser to cause the web browser to display the user interface, the user interface further configured to enable the user to provide a comment for the web content.

4. The method of claim 1, wherein the transmitting of the plug-in module further comprises transmitting the plug-in module to the web browser to cause the web browser to display the user interface, the user interface further configured to enable the user to submit the web content to a search engine.

5. The method of claim 1, wherein the transmitting of the plug-in module further comprises transmitting the plug-in module to the web browser to cause the web browser to display the user interface, the user interface further configured to enable the user to identify the web content for submission to a search engine.

6. The method of claim 1, wherein the transmitting of the plug-in module further comprises transmitting the plug-in module to the web browser to cause the web browser to display the user interface, the user interface further configured to transmit a URL of the displayed web content to the first server computer for extraction of the portion of the web content.

7. The method of claim 6, further comprising extracting, by the first server computer, the at least a portion of the web content from the displayed web content after receiving the URL.

8. The method of claim 1, wherein the transmitting of the plug-in module further comprises transmitting the plug-in module to the web browser to cause the web browser to display the user interface, the user interface further configured to enable the user to post at least some of the web content to a social networking site.

9. The method of claim 1, wherein the displaying of the at least a portion of the web content in the user interface further comprises displaying representative information of the web content selected from a group of representative information types consisting of a picture, an icon, a sentence, and a paragraph in the web content.

10. The method of claim 1, wherein the transmitting of the plug-in module further comprises transmitting the plug-in module to the web browser to cause the web browser to display the user interface, the user interface further configured to display advertisements posted by other users who have communicated with the first server computer for the plug-in module.

11. The method of claim 1, wherein the portion is selected in an automated way by the user interface without prior arrangement between the web content and the plug-in module.

12. The method of claim 1, wherein the portion is selected in an automated way by processing the web content in an automated way.

13. The method of claim 1, wherein the portion is selected in an automated way in accordance with settings of the user interface.

14. A server computer comprising:
a processor;
a medium storing instructions that, when executed by the processor, cause the server computer to:
transmit a plug-in module to a web browser of a client computer, the web browser displaying web content in a main window from a separate server computer,
wherein the plug-in module, when activated, causes the web browser to display a user interface to a user of the client computer, wherein the user interface is separate from the main window of the web browser,
wherein the user interface automatically selects a portion of the web content based on settings received from the user via the user interface that include settings to display one or more of the following from the web content: a picture, an icon, a sentence, and a paragraph,
wherein the user interface is configured to transmit, to the server computer, user-created content in association with an identification of the web content,
wherein the user interface is configured to display content associated with the web content from the separate server computer, delivered by the server computer, from other users who have downloaded the plug-in module,
wherein the user interface displays the portion of the web content within the user interface, and
wherein the user interface is configured to enable the user to:
receive an instruction to operate on the displayed at least a portion of the web content,
adjust the portion of the web content displayed in the user interface, wherein adjusting the portion of the web content comprises adding content to the portion of web content, removing content from the portion of web content, or modifying the portion of web content, and
post the user content generated based on an adjustment of the portion of the web content;
add the web content to an index of web content, the indexing storing the URL of the web content;
associate the user content with the web content in the index;
transmit the plug-in module to a second client computer;
receive, from the plug-in module at the second client computer, a URL;
identify the web content in the index based on the URL received from the second client computer; and
transmit an advertisement including the user content associated with the indexed web content to the second client computer for display.

15. The server computer of claim 14, wherein the transmission logic for transmitting the plug-in module further comprises transmission logic for transmitting the plug-in module to the web browser to cause the web browser to display the user interface, the user interface further configured to enable the user to provide a rating for the web content.

16. The server computer of claim 14, wherein the transmission logic for transmitting the plug-in module further comprises transmission logic for transmitting the plug-in module to the web browser to cause the web browser to display the user interface, the user interface further configured to enable the user to provide a comment for the web content.

17. The server computer of claim 14, wherein the transmission logic for transmitting the plug-in module further comprises transmission logic for transmitting the plug-in module to the web browser to cause the web browser to display the user interface, the user interface further configured to enable the user to submit the web content to a search engine.

18. The server computer of claim 14, wherein the transmission logic for transmitting the plug-in module further comprises transmission logic for transmitting the plug-in module to the web browser to cause the web browser to display the user interface, the user interface further configured to enable the user to identify the web content for submission to a search engine.

19. The server computer of claim 14, wherein the transmission logic for transmitting the plug-in module further comprises transmission logic for transmitting the plug-in module to the web browser to cause the web browser to display the user interface, the user interface further configured to transmit a URL of the displayed web content to the server computer for extraction of the web content.

20. The server computer of claim 19, further comprising extraction logic executed by the processor for extracting the at least a portion of the web content from the displayed web content after receiving the URL.

21. The server computer of claim 14, wherein the transmission logic for transmitting the plug-in module further comprises transmission logic for transmitting the plug-in module to the web browser to cause the web browser to display the user interface, the user interface further configured to enable the user to post at least some of the web content to a social networking site.

22. The server computer of claim 14, wherein the transmission logic for transmitting the plug-in module further comprises transmission logic for transmitting the plug-in module to the web browser to cause the web browser to display the user interface, the user interface further configured to display representative information of the web content selected from a group of representative information types consisting of a picture, an icon, a sentence, and a paragraph in the web content.

23. A non-transitory computer readable storage medium storing computer program instructions that, when executed by a server computer, cause the server computer to:
 transmit a plug-in module to a web browser of a client computer, the web browser displaying web content in a main window from a separate server computer,
 wherein the plug-in module, when activated, causes the web browser to display a user interface to a user of the client computer, wherein the user interface is separate from the main window of the web browser,
 wherein the user interface automatically selects a portion of the web content based on settings received from the user via the user interface that include settings to display one or more of the following from the web content: a picture, an icon, a sentence, and a paragraph,
 wherein the user interface is configured to transmit, to the server computer, user-created content in association with an identification of the web content,
 wherein the user interface is configured to display content associated with the web content from the separate server computer, delivered by the server computer, from other users who have downloaded the plug-in module,
 wherein the user interface displays the portion of the web content within the user interface, and
 wherein the user interface is configured to enable the user to:
  operate on the displayed at least a portion of the web content,
  adjust the portion of the web content displayed in the user interface to generate user content, wherein adjusting the portion of the web content comprises adding content to the portion of web content, removing content from the portion of web content, or modifying the portion of web content, and
  post the user content generated based on an adjustment of the portion of the web content;
 add the web content to an index of web content, the indexing storing the URL of the web content;
 associate the user content with the web content in the index;
 transmit the plug-in module to a second client computer;
 receive, from the plug-in module at the second client computer, a URL;
 identify the web content in the index based on the URL received from the second client computer; and
 transmit an advertisement including the user content associated with the indexed web content to the second client computer for display.

* * * * *